United States Patent
Mese et al.

(10) Patent No.: US 10,063,511 B2
(45) Date of Patent: Aug. 28, 2018

(54) METHOD TO REFINE ADDRESSEES IN A GROUP ENVIRONMENT

(71) Applicant: LENOVO (Singapore) PTE, LTD., New Tech Park (SG)

(72) Inventors: John Carl Mese, Cary, NC (US); Nathan J. Peterson, Durham, NC (US); Russell Speight VanBlon, Raleigh, NC (US); Arnold S. Weksler, Raleigh, NC (US)

(73) Assignee: Lenovo (Singapore) PTE, LTD., New Tech Park (SG)

( * ) Notice: Subject to any disclaimer, the term of this patent is extended or adjusted under 35 U.S.C. 154(b) by 474 days.

(21) Appl. No.: 14/449,929

(22) Filed: Aug. 1, 2014

(65) Prior Publication Data
US 2016/0036754 A1   Feb. 4, 2016

(51) Int. Cl.
*H04L 12/58* (2006.01)
*H04L 29/06* (2006.01)
*H04L 12/24* (2006.01)

(52) U.S. Cl.
CPC ........ *H04L 51/28* (2013.01); *H04L 29/06408* (2013.01); *H04L 41/026* (2013.01); *H04L 51/00* (2013.01)

(58) Field of Classification Search
None
See application file for complete search history.

(56) References Cited

U.S. PATENT DOCUMENTS

| | | | |
|---|---|---|---|
| 8,577,970 B2* | 11/2013 | Hogan | G06Q 10/107 709/203 |
| 2004/0093382 A1* | 5/2004 | Kulkarni | H04L 51/28 709/206 |
| 2009/0112998 A1* | 4/2009 | Oprescu-Surcobe | G06Q 10/107 709/206 |
| 2010/0017607 A1* | 1/2010 | Shkolnikov | H04L 51/28 713/168 |
| 2012/0158860 A1* | 6/2012 | Chakra | H04L 51/28 709/206 |

* cited by examiner

*Primary Examiner* — Azizul Choudhury
(74) *Attorney, Agent, or Firm* — Kunzler, PC (57) ABSTRACT

For an electronic communication environment, an apparatus for refining addresses in a group messaging environment is disclosed. The apparatus may include a processor and a memory that stores code executable by the processor, including code that identifies a message addressed to a group, resolves the group into a plurality of addressees, and sends the message to a subset of the addressees. The apparatus may notify the user that the message is addressed to the group. The apparatus may further receive user input defining the subset of the addressees, wherein the message is addressed based on the user input. Additionally, the apparatus may prompt for confirmation in response to the user selecting all addressees in the group. A method and computer program product also perform the functions of the apparatus.

18 Claims, 6 Drawing Sheets

METHOD TO REFINE ADDRESSEES IN A GROUP ENVIRONMENT

FIELD

The subject matter disclosed herein relates to electronic communications and more particularly relates to refining addressees in a group communication environment.

BACKGROUND

Description of the Related Art

Electronic communications, such as electronic mail, chat rooms, text messaging, and the like, facilitate easy communication with groups of people. However, it is not always obvious whether messages belong to a group conversation nor is it always easy to identify the entirety of that group. When responding to a message it may not be obvious to the respondent that the response is addressed to multiple people. Accordingly, respondents sometimes unknowingly reply to group emails burdening all addressees with spurious mail.

BRIEF SUMMARY

An apparatus for refining addresses in a group messaging environment is disclosed. A method and computer program product also perform the functions of the apparatus.

The apparatus may include a processor and a memory that stores code executable by the processor, the code comprising: code that identifies a message addressed to a group, resolves the group into a plurality of addressees, and sends the message to a subset of the addressees. In some embodiments, the apparatus also includes code that receives user input defining the subset of the addressees, wherein the message is addressed based on the user input.

In certain embodiments, the apparatus also includes code that prompts for confirmation in response to the user selecting all of the addressees and/or code that addresses the message to additional recipients unassociated with the group in response to the user defining the subset of the addressees. The apparatus may further include code that presents, to a user, a list of addressees for user selection, wherein the list is ordered based on user activity and/or code that filters the list of addressees based on message history.

In certain embodiments, the apparatus also includes code that notifies the user that the message is addressed to the group. In some embodiments, the user notification may be an audible notification, a visual notification, and/or a haptic notification. In certain embodiments, the apparatus also include code that suggests one or more addressees based on a user activity log. In some embodiments, the apparatus stores the subset of the addressees in a user activity log.

The method may include identifying, by use of a processor, a message addressed to a group, receiving a user selection of at least one addressee belonging to the group, and addressing the message based on the user selection of at least one addressee belonging to the group.

In certain embodiments, the method also includes resolving the group into a plurality of group members, and presenting, to the user, the plurality of group members, wherein the user selection of at least one addressee comprises a selection from the presented plurality of group members.

In certain embodiments, the method also includes notifying the user that the message is addressed to the group. In some embodiments, the user notification includes a visual notification selected from the group comprising: an icon, text of a particular color, text of a particular size, text in bold, highlighted text, underlined text, and blinking text. In certain embodiments, the method also includes suggesting, to the user, one or more addressees based on user activity.

In some embodiments, identifying a message addressed to a group includes determining a number of recipient addresses associated with the message, comparing the number of addresses to a threshold amount, and identifying the message as being addressed to a group in response to the number of recipient addresses exceeding the threshold amount. In some embodiments, identifying a message addressed to a group comprises comparing a recipient alias of the message to a list of group aliases.

The computer program product may include a computer readable storage medium that stores code executable by a processor to perform: identifying a message addressed to a group, resolving the group into a plurality of group members, receiving a user selection of at least one addressee from among the plurality of group members, and sending the message to the at least one user-selected addressee.

In certain embodiments, the computer program product also includes code for notifying the user that the message is addressed to the group and/or code for suggesting, to the user, one or more addressees based on user activity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products identify a message addressed to a group, notify the user that the message is addressed to a group, resolve the group into a plurality of addressees, receive a user selection of a subset of the addressees, and send the message to the user-defined subset, thereby allowing the user to reply to some of the group and to avoid unintentionally reply to all members of the group. In some embodiments, the user is prompted for confirmation when the reply will go out to multiple persons. Additionally, an option may be presented to select or de-select recipients providing a de facto "reply to some" instead of the existing "reply to all."

Figure 1:
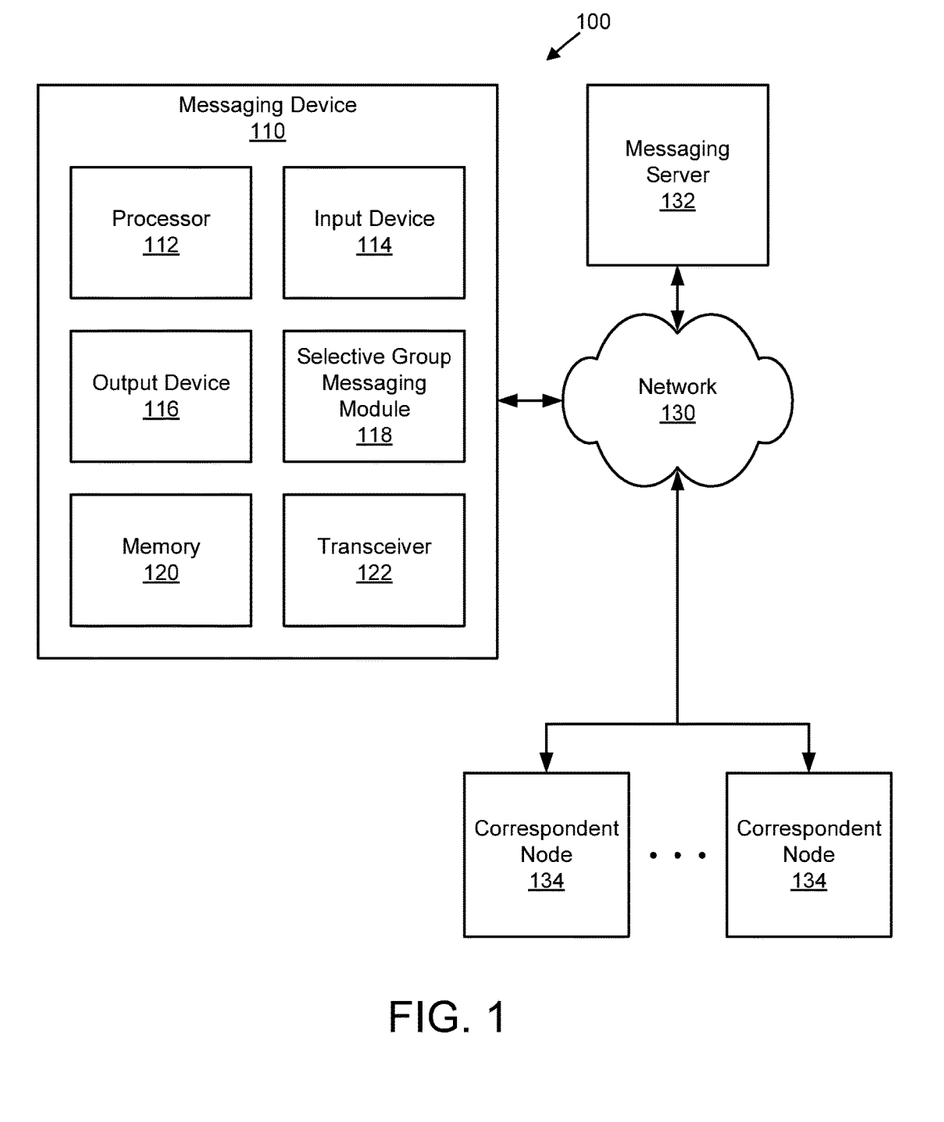
FIG. 1 is a schematic block diagram illustrating one embodiment of a system for refining addresses in a group messaging environment.

FIG. 1 depicts a system 100 for refining addresses in a group messaging environment, according to embodiments of the disclosure. The system 100 includes a messaging device 110 and a plurality of correspondent nodes 134-138 communicatively coupled via a data network 130. In some embodiments, the system 100 also include a messaging server 132 that provides a messaging service among the messaging device 110 and the plurality of correspondent nodes 134-138.

The messaging device 110 comprises a processor 112, an input device 114, an output device 116, a selective group messaging module 118, a memory 120, and a transceiver 122. In some embodiments, the messaging device 110 includes a body or an enclosure, wherein the components of the messaging device 110 are contained within the enclosure. In some embodiments, the messaging device 110 includes a power source, for example a battery or a power adapter, which provides electrical power to components of the messaging device 110. In certain embodiments, the components of the messaging device 110 are communicatively coupled to each other, for example via a computer bus.

The processor 112, in one embodiment, may comprise any known controller capable of executing computer-readable instructions and/or capable of performing logical operations. For example, the processor 112 may be a microcontroller, a microprocessor, a central processing unit (CPU), a graphics processing unit (GPU), an auxiliary processing unit, a FPGA, or similar programmable controller. In some embodiments, the processor 112 executes instructions stored in the memory 120 to perform the methods and routines described herein. The processor 112 is communicatively coupled to the input device 114, the selective group messaging module 118, the output device 116, and the memory 120.

The input device 114, in one embodiment, may comprise any known computer input device including a touch panel, a button, a keyboard, or the like. For example, the input device 114 may include a handwriting input unit operatively coupled to the processor 112. In some embodiments, the input device 114 may be integrated with the output device 116, for example, as a touchscreen or similar touch-sensitive display. In some embodiments, the input device 114 comprises a touchscreen such that text may be input by using a virtual keyboard displayed on the touchscreen and/or by handwriting on the touchscreen. In some embodiments, the input device 114 comprises two or more different devices, such as a keyboard and a touch panel.

The output device 116, in one embodiment, is configured to output visual, audible, and/or haptic signals. In some embodiments, the output device 116 includes an electronic display capable of outputting visual data to a user. For example, the output device 116 may include an LCD display, an LED display, an OLED display, a projector, or similar display device capable of outputting images, text, or the like to a user. In certain embodiments, the output device 116 includes one or more speakers for producing sound, such as an audible alert or notification. In some embodiments, the output device 116 includes one or more haptic devices for producing vibrations, motion, or other haptic feedback.

In some embodiments, all or portions of the output device 116 may be integrated with the input device 114. For example, the input device 114 and output device 116 may form a touchscreen or similar touch-sensitive display. As another example, the input device 114 and output device 116 may form a display that includes haptic response mechanisms. In other embodiments, the output device 116 may be located near the input device 114. The output device 116 may receive instructions and/or data for output from the processor 112 and/or the selective group messaging module 118.

The selective group messaging module 118, in one embodiment, is configured to identify a message addressed to a group, resolve the group into a plurality of addressees, and send the message to a subset of the addressees. The selective group messaging module 118 may also receive user input defining the subset of the addressees and address the message based on the user input. In certain embodiments, the selective group messaging module 118 suggests one or more addressees based on user activity.

In some embodiments, the selective group messaging module 118 notifies the user that the message is addressed to the group and/or prompts for confirmation in response to the user selecting all of the addressees. The selective group messaging module 118 may control the output device 116 to provide one or more of an audible notification, a visual notification, and a haptic notification.

The selective group messaging module 118 may be comprised of computer hardware, computer software, or a combination of both computer hardware and computer software. For example, the selective group messaging module 118 may comprise circuitry, or a processor, configured to identify a message addressed to a group. As another example, the selective group messaging module 118 may comprise computer program code that allows the processor 102 to resolve the group into a plurality of addressees, and send the message to a user-specified subset of the addressees. The selective group messaging module 118 is discussed in further detail with reference to FIG. 2, below.

The memory 120, in one embodiment, is a computer readable storage medium. In some embodiments, the memory 120 includes volatile computer storage media. For example, the memory 120 may include a random access memory (RAM), including dynamic RAM (DRAM), synchronous dynamic RAM (SDRAM), and/or static RAM (SRAM). In some embodiments, the memory 120 includes non-volatile computer storage media. For example, the memory 120 may include a hard disk drive, a flash memory, or any other suitable non-volatile computer storage device. In some embodiments, the memory 120 includes both volatile and non-volatile computer storage media.

In some embodiments, the memory 120 stores data relating to refining addresses in a group messaging environment. For example, the memory 120 may store messages, groups, addresses, user activity, user profiles, and the like. In some embodiments, the memory 120 also stores program code and related data, such as an operating system operating on the messaging device 110.

The transceiver 122, in one embodiment, is configured to send and to receive electronic communications via the network 130. In certain embodiments, the transceiver 122 is a wireless transceiver capable of exchanging information via electromagnetic radiation (e.g., communication via radio frequencies, infrared, visible light, and the like) or sound (e.g., ultrasonic communication). In certain embodiments, the processor 112 is a wired transceiver capable of exchanging information via a transmission line (e.g., wire, data cable, or optical fiber). In some embodiments, the transceiver 122 receives messages from the messaging server 132. In other embodiments, the transceiver 122 receives messages from one or more of the correspondent nodes 134.

The data network 130, in one embodiment, is a telecommunications network configured to allow the messaging device 110, the messaging server 132, and/or any of the correspondent nodes 134 to pass data to each other. The network 130 may be comprised of wired data links, wireless data links, and/or a combination of wired and wireless data links. Examples of wireless data networks include, but are not limited to, a wireless cellular network, a local wireless network, such as a Wi-Fi network, a Bluetooth® network, a near-field communication (NFC) network, an ad hoc network, and/or the like. The data network 130 may include a wide area network (WAN), a storage area network (SAN), a local area network (LAN), an optical fiber network, the internet, or other digital communication network. In some embodiments, the data network 130 may include two or more networks. The data network 130 may include one or more servers, routers, switches, and/or other networking equipment. The data network 130 may also include computer readable storage media, such as a hard disk drive, an optical drive, non-volatile memory, random access memory (RAM), or the like.

The messaging server 132, in one embodiment, is a server configured to support one or more messaging services. In some embodiments, the 132 may provide an internet-based messaging service. For example, the messaging device 110 and/or the correspondent nodes 134 may access the messaging service using a web browser or the like. Examples of messaging services that may be supported by the messaging server 132 include, but are not limited to, email, short messaging service (SMS), text messaging, multimedia messaging service (MMS), instant messaging, and the like.

In some embodiments, the messaging server 132 is configured to resolve a group address into a plurality of individual addresses. For example, the messaging server may include a database containing known group addresses or group aliases and a plurality of individual addresses corresponding to members of the group. In certain embodiments, the messaging server 132 may respond to address resolution requests by the messaging device and provide a plurality of individual addresses corresponding to a group address included in the request.

In some embodiments, the messaging server 132 receives a message from a messaging device or correspondent node via the network 130, identifies a network address for each message recipient, and sends the message to each message recipient using the network address and the network 130. In certain embodiments, the messaging server 132 resolves a group address into a plurality of member addresses and sends a message addressed to a group address to each member address. In certain embodiments, the messaging server 132 includes a selective group messaging module, similar to the x118, capable of intercepting a message, determining whether the message is addressed to a group, notifying the sender and providing a reply-to-some option in response to the message being addressed to a group, and addressing the message to a sender-selected subset of the members of the group.

The correspondent nodes 134, in one embodiment, are configured to send and receive messages via the network 130. For example, each correspondent node 134 may send a message to the messaging device 110, the messaging server 132, and/or to another correspondent node 134. In some embodiments, each correspondent node 134 is a messaging device comprising a processor, a memory, and a transceiver, similar to the messaging device 110. The correspondent nodes 134 may access the network 130 via wired or wireless data links. While only two correspondent nodes 134 are depicted in FIG. 1, in other embodiments, any number of correspondent nodes 134 may be included in the system 100.

In some embodiments, the correspondent nodes 134 may comprise a group and may be addressed using a group address. For example, the correspondent nodes 134 may be associated with a particular group address and any messages addressed to the particular group address may be received at each correspondent node 134. In some embodiments, the messaging device 110 and/or the messaging server 132 may identify a message addressed to the particular group address and resolve the group address into a plurality of addresses, each address corresponding to one of the correspondent nodes 134. The messaging device 110 and/or the messaging server 132 may then address the message to a user-selected subset of the correspondent nodes 134 rather than to all correspondent nodes 134 associated with the particular group address.

Figure 2:
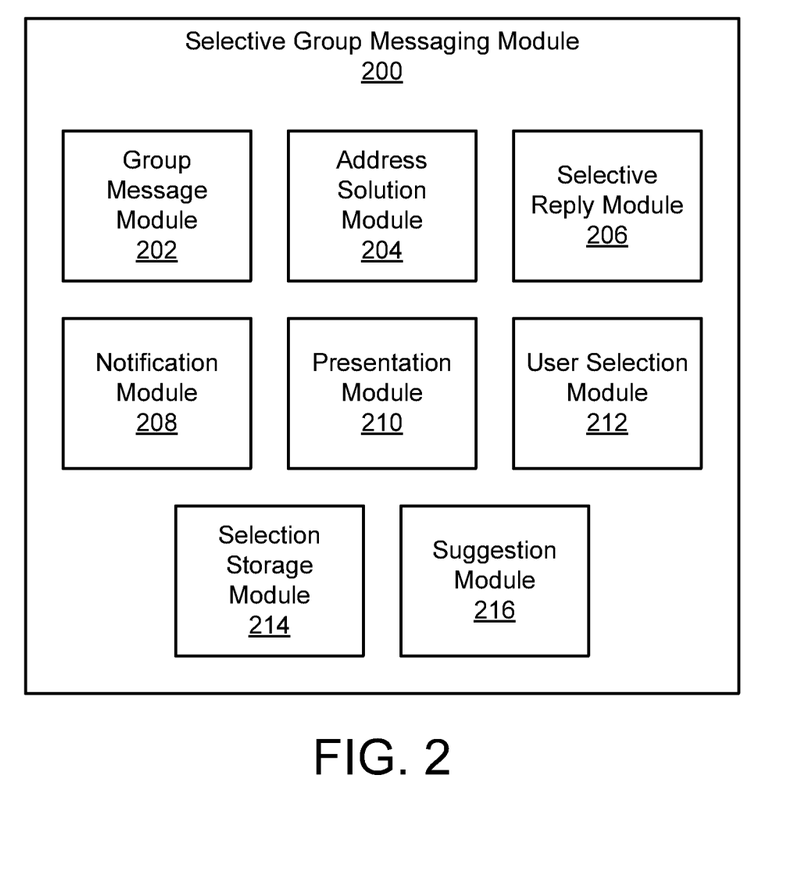
FIG. 2 is a schematic block diagram illustrating one embodiment of an apparatus for refining addresses in a group messaging environment.

FIG. 2 depicts a selective group messaging module 200 for refining addresses in a group messaging environment, according to embodiments of the disclosure. In some embodiments, the selective group messaging module 200 may be similar to, and perform the same functions as, the selective group messaging module 118 described above with reference to FIG. 1. In some embodiments, the selective group messaging module 200 may be part of a messaging device, such as the messaging device 110. In other embodiments, the selective group messaging module 200 may be part of a messaging server, such as the messaging server 132 or a webmail server.

In general, as described above, the selective group messaging module 200 identifies a message addressed to a group, resolves the group into a plurality of addressees, and sends the message to a subset of the addressees. In some embodiments, the selective group messaging module 200 receives user input defining the subset of the addressees, wherein the message is addressed based on the user input. In certain embodiments, the selective group messaging module 200 may act upon receipt of a group message, such as when a messaging device received a message addressed to a group. In certain embodiments, the selective group messaging module 200 may act when a user begins to reply to the group message and/or when the user indicated that the reply should be sent (e.g., in response to the user pressing a "send" button).

The selective group messaging module 200, in one embodiment, includes a group message module 202, an address solution module 204, and a selective reply module 206. In some embodiments, the selective group messaging module 200 also includes one or more of a notification module 208, a presentation module 210, a user selection module 212, a selection storage module 214, and/or suggestion module 216. The modules of the selective group messaging module 200 may be communicatively coupled to one another.

The group message module 202, in one embodiment, is configured to determine whether a message is addressed to a group. The group message module 202 may examine a message to determine whether a message recipient matches a known group or group container (e.g., a group address or a mailing list). In some embodiments, the group message module 202 compares the message recipient to the user's contacts to determine whether a message is addressed to a group container. In some embodiments, the group message module 202 searches a database to determine whether a message is addressed to a group container. The database may be a local to the selective group messaging module 200 or it may be a remote database (i.e., a database stored on the messaging server 132).

In some embodiments, the group message module 202 determines whether the message is addresses to a group by calculating a number of addressed message recipients (e.g., addresses in a "to" field). The group message module 202 may then compare the number of addresses to a group threshold value and determine that the message as being addressed to a group in response to the number of addressees exceeding the threshold amount. The group threshold, in one embodiment, may be defined by the user, by a provider of the messaging device 110, and/or by a provider of the messaging service.

In some embodiments, a message may be addressed to a group container (e.g., a group address, a group alias, or a distribution list) and the group message module 202 may determine whether the message is addressed to a group container by examining a message recipient (e.g., an address in a "recipient" field) for characteristics indicative of a group container. In certain embodiments, the group message module 202 may determine whether the address is an alias associated with multiple addresses. In certain embodiments, the group message module 202 determines whether message is addressed to a distribution or mailing list and/or to a multicast or broadcast addresses. In some embodiments, the group message module 202 may consult with a mail or messaging server, such as the messaging server 132, when examining the address.

The address solution module 204, in one embodiment, is configured to resolve the group into a plurality of addressees. In some embodiments, the address solution module 204 resolve the group container by identifying a plurality of group members associated with the group container and retrieving an individual address for each identified group member. Examples of individual addresses associated with each group member include, but are not limited to, email addresses, phone numbers, usernames, or any other identifier used to communicate with an identified group member.

In some embodiments, the address solution module 204 searches a database using the group container to resolve the group container into a plurality of addressees. For example, a database entry associated with the group container may include a plurality of individual addresses belonging to members of the group. The address solution module 204 may retrieve each individual address associated with the group container. In some embodiments, the database is a local database, such as a contacts database on the messaging device 110. In other embodiments, the database is a remote database, for example, located on the messaging server 132.

The selective reply module 206, in one embodiment, addresses the message to at least one addressee belonging to the group. In some embodiments, the selective reply module 206 addresses the message in response to user selection of the at least one addressee belonging to the group. In some embodiments, the selective reply module 206 changes the recipient of the message. For example, if the message is an email, the selective reply module 206 may edit the "to:" field to include only the user-selected addressees. As another example, the selective reply module 206 may change header information of the message to remove the group and to include one or more individual addresses of user-selected group members.

In some embodiments, the selective reply module 206 sends the message to a subset of addressees identified by the address solution module 204. For example, the selective reply module 206 may address and send the message to one or more group members. In some embodiments, the selective reply module 206 receives user input defining the subset of addressees to which the message is then sent. For example, the user may select one or more group members from a list of addresses resolved from the group. In some embodiments, the selective reply module 206 may determine that the user selection includes all individual addressees associated with the group. The selective reply module 206 may then prompt for confirmation in response to the user selecting all of the individual addressees before addressing and/or sending the message to all individual addressees.

In some embodiments, the selective group messaging module 200 intercepts a composed message addressed to a group and the selective reply module 206 revises a recipient list of the message (e.g., a "to:" field) to include a subset of addresses associated with the group (e.g., to a user-selected subset). The selective reply module 206 then sends the revised message to the plurality individual addresses associated with the selected subset of addresses. In some embodiments, the selective reply module 206 receives user instruction to address the message to additional recipients unassociated with the group address. For example, in addition to one or more group members, the user may choose to send the message to one or more additional recipients who are not otherwise associated with the group.

The notification module 208, in one embodiment, notifies the user that the message is addressed to a group (e.g., to a group address and/or to more than a threshold number of people). The notification may occur in response to the group message module 202 determining that the message is addressed to a group. In some embodiments, a group address may not be easily identified by a user as being group address. The notification module 208 may be configured to notify the user only when the group address in not easily identifiable as a group address. In some embodiments, the notification module 208 may be activated and/or deactivated by user instruction. For example, the notification may include an option to discontinue future notifications associated with the same group address.

In some embodiments, the notification module 208 may control an output device, such as the output device 116, to generate one or more of an audible notification, a visual notification, and/or a haptic notification. For example, the notification module 208 may generate a pop-up visual notification as well as an audible tone or a vibration in response to the message being addressed to a group. Examples of audible notifications include, but are not limited to, playing a tone or tune, playing a voice recording, and playing a computer generated voice. Examples of visual notifications include, but are not limited to, displaying an icon, displaying a pop-up notice, changing message text of a particular color and/or a particular size, and emphasizing a portion of the message text (e.g., highlighting, underlining, bolding, and/or blinking).

In some embodiments, the notification module 208 may select a visual notification based on user activity. For example, the first time a message is determined to be addressed to a group container, the notification module 208 may display a pop-up or similar notice. Thereafter, more subtle notification such as an icon or emphasized text may be used. In certain embodiments, the notification module 208 may select a notification based on a frequency associated with the group. For example, the notification module 208 may use more subtle notifications (such as bolded, highlighted, underlined, or colored text in a recipient field) with more frequently used group addresses, while less subtle notifications (such as blinking text, contrasting icons, or pop-up) may be used for less frequently used group addresses.

In some embodiments, the notification module 208 may notify the user that a message is addressed to a group and prompt whether the user desires to reply to a subset of the group. In some embodiments, the notification module 208 may notify the user in response to the user selecting all of the addressees associated with the group and prompt for confirmation. While depicted as a separate module, in one embodiment the notification module 208 is a component of the group message module 202.

The presentation module 210, in one embodiment, is configured to display, to the user, a plurality of members associated with the group. For example, the presentation module 210 may receive a list of individual addressees resolved from a group container and display the list to the user. In some embodiments, the presentation module 210 is further configured to receive a user selection of at least one of the plurality of group members. For example, the user may select one or more individual addressees from the presented plurality of group members.

In some embodiments, the presentation module 210 presents the plurality of group members based on user activity and/or on message history. In certain embodiments, the presentation module 210 may order the plurality of group members in a list based on user activity. For example, in one embodiment, the presentation module 210 may present at the top of the list a most often messaged individual from the plurality of group members. In certain embodiments, the presentation module 210 may filter the plurality of group members based on a conversation associated with the message. For example, where the message addressed to a group address is the latest in a series of messages, the presentation module 210 may filter a list of individual addressees for user selection include only those of the plurality of group members that have authored messages in the series of messages.

In some embodiments, the presentation module 210 may present an option to "reply-to-some" of the addresses associated with the message. For example, if a received message was addressed to a plurality of addresses, the presentation module 210 may present a reply-to-some option on an interface associated with the message. In some embodiments, the reply-to-some option is presented adjacent to a "reply" and/or to a "reply-to-all" option. The reply-to-some option may include a link, a button, or the like. As another example, if a message that the user is composing is addressed to a group container, the presentation module 210 may present a reply-to-some option associated with the group container. The reply-to-some option associated with the group may include a pop-up window, a link, an adjacent button, or the like.

In some embodiments, the presentation module 210 prompt whether the user desires to reply to a subset of the group. In some embodiments, the presentation module 210 may determine that a user selection includes all individual addressees associated with the group and may prompt for confirmation in response. While depicted as a separate module, in one embodiment the presentation module 210 is a component of the group message module 202 and/or the address solution module 204.

The user selection module 212, in one embodiment, is configured to receive user input defining the subset of individual addressees to which the selective reply module 206 addresses and/or sends the message. In some embodiments, the user selection module 212 may monitor input received via an input device, such as the input device 114, responsive to the notification module 208 and/or the presentation module 210 presenting a list of addresses associated with the group. The user selection module 212 may then determine whether user input includes a selection from the list of addresses. For example, after being presented with a list of individual addressees associated with the group, the user selection module 212 may receive a user selection of at least one addressee belonging to the group, the user selection defining the subset of individual addressees. In certain embodiments, the user selection module 212 may prompt for confirmation in response to the user selecting all of the addressees belonging to the group.

In some embodiments, the user selection module 212 is further configured to receive user selection of additional recipients unassociated with the group. For example, upon learning that the message is addressed to a group and after selecting a subset of the group members, the user may select additional individuals not otherwise associated with the group to whom the message should also be addressed. In some embodiments, the user selection module 212 is further configured to provide the user selection to the selective reply module 206, the selective reply module 206 addressing the message based on the user selection. While depicted as a separate module, in certain embodiments, the user selection module 212 may be a component of the selective reply module 206.

The selection storage module 214, in one embodiment, stores data associated with the user selection of the subset of the group members. The selection storage module 214 may store the user-selection data in non-volatile memory, such as within the memory 120. In some embodiments, the selection storage module 214 stores user-selection data in an activity log and/or in a user profile. In certain embodiments, the user-selection data within the activity logs and/or user profiles may be used, in some embodiments, by the presentation module 210 to arrange and/or filter a list of individual addressees associated with the group.

In some embodiments, the selection storage module 214 is further configured to detect patterns or user preferences relating to which group members the user selects. For example, the user selection module 212 may analyze the user-selection data to identify frequently addressed individuals within a particular group (e.g., associated with a particular group address). These patterns and/or preferences may be stored with the user profile and used by the suggestion module 216 to suggest, to the user, one or more additional addressees to whom the message should be addressed. While the selection storage module 214 is depicted as a separate module, in some embodiments, the selection storage module 214 may be a part of the address solution module 204, the selective reply module 206, the presentation module 210, and/or the user selection module 212.

The suggestion module 216, in one embodiment, suggests one or more addressees based on user activity. For example, the suggestion module 216 may suggest that the user address the message to one or more frequently addressed individuals within a particular group (e.g., associated with a particular group address) associated with the message. In some embodiments, the suggestion module 216 suggests the one or more addressees based on patterns or user preferences relating to which group members the user selects. For example, the suggestion module 216 may suggest the one or more addressees based on user-selection data recorded by the selection storage module 214.

In some embodiments, the suggestion module 216 suggests only individual addressees associated with the group. In other embodiments, the suggestion module 216 suggests one or more additional addressees that are not associated with the group. While depicted as a separate module, in certain embodiments, the suggestion module 216 may be a component of the selective reply module 206 and/or the presentation module 210.

FIGS. 3A-3D depict a messaging device 300 for refining addresses in a group messaging environment, according to embodiments of the disclosure. The messaging device 300, in one embodiment, identifies a message addressed to a group, resolves the group into a plurality of group members, receives a user selection of at least one addressee from among the plurality of group members, and addresses the message to the at least one user-selected addressee. In some embodiments, the messaging device 300 may be similar to the messaging device 110, the selective group messaging module 118, and/or the selective group messaging module 200 described above with reference to FIGS. 1 and 2.

The messaging device 300, in one embodiment, includes a display 302 (e.g., a touchscreen display) that displays a messaging interface to the user. As depicted, the messaging interface may include an addressee field 304, a "subject" field 306, a message body 308, and a virtual keyboard 310. In some embodiments, the messaging device 300 may further include one or more of a group message module, an address solution module, a selective reply module, a notification module, a presentation module, a user selection module, a selection storage module, and/or a suggestion module, as described above with reference to FIG. 2.

Figure 3A:
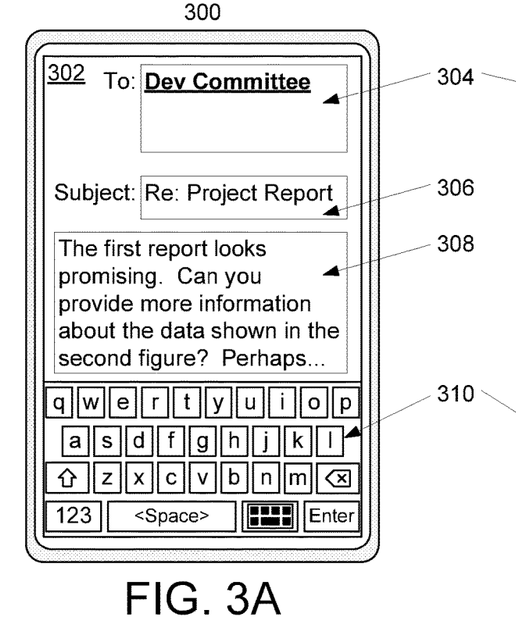
FIG. 3A is a diagram illustrating one embodiment of a messaging device for refining addresses in a group messaging environment.

FIG. 3A depicts the messaging device 300 after the receiving a message addressed to a group and as the replies to the group address. Here, the group address is listed in the addressee field 304 and corresponds to the alias "Dev Committee." The messaging device 300 examines the addresses and/or aliases in the x34 to identify any group addresses. In some embodiments, the messaging device 300 compares the addresses in the addressee field 304 to a list or table of known group addresses. In certain embodiments, the messaging device 300 determines whether a number of individuals (e.g., individual addresses) associated with an address in the addressee field 304 is greater than a threshold number. Here, the alias "Dev Committee" is associated with six individual addresses and the messaging device 300 notifies the user of the group alias by using bold and underlined typeface.

Figure 3B:
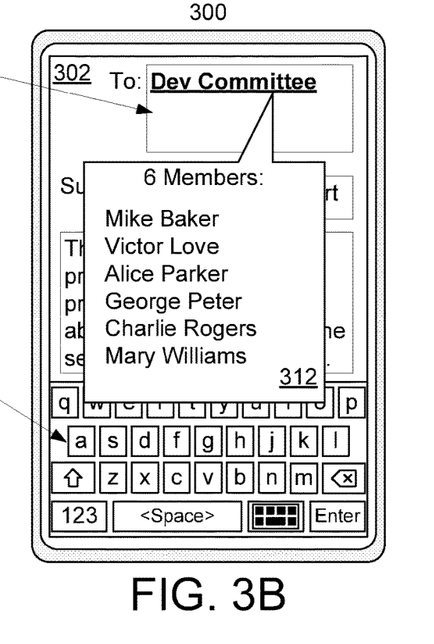
FIG. 3B is a diagram illustrating another embodiment of the messaging device of FIG. 3A.

FIG. 3B depicts the messaging device 300 presenting a list 312 of group members associated with the "Dev Committee" alias. Here, the six members are presented in the list 312 of group members. In some embodiments, the messaging device 300 resolves the group alias into a plurality of group members and their associated addresses. In certain embodiments, the messaging device 300 may resolve the group alias by searching a database for members (and corresponding addresses) associated with the group alias. While FIG. 3B depicts presenting the list 312 in alphabetical order (by surname), in other embodiments the list 312 may be ordered according to how frequently the user sends and/or receives messages to each group member. Alternatively, the list 312 may be ordered based on which of the group members have composed messages in a conversation to which the present reply belongs.

Figure 3C:
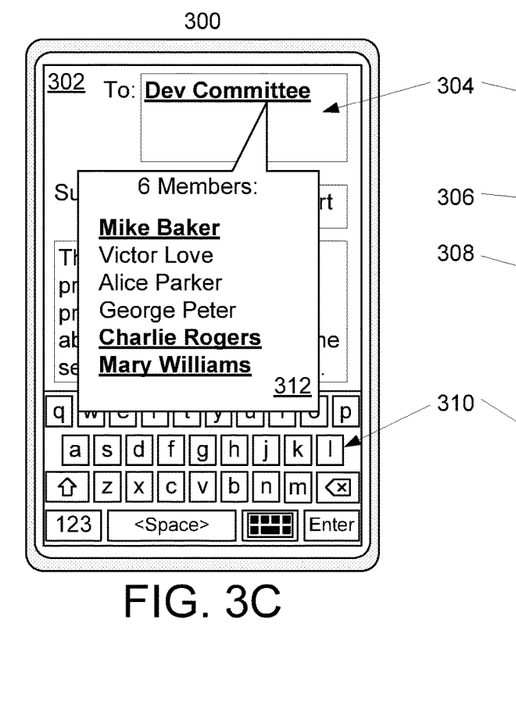
FIG. 3C is a diagram illustrating another embodiment of the messaging device of FIG. 3A.

FIG. 3C depicts the messaging device 300 receiving a user selection of at least one addressee from among the plurality of group members. Here, the user selects three group members ("Mike Baker," "Charlie Rogers," and "Mary Williams") from among the plurality of presented group members. In some embodiments, the user selection is received via touchscreen input. In other embodiments, the user selection may be received via voice command.

Figure 3D:
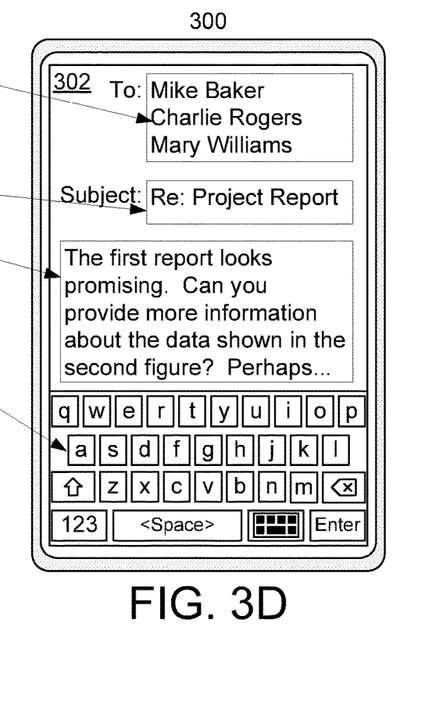
FIG. 3D is a diagram illustrating another embodiment of the messaging device of FIG. 3A.

FIG. 3D depicts the messaging device 300 addressing the reply message to the user-selected group members. In some embodiments, the messaging device 300 removes the group alias from the addressee field 304 and adds addresses corresponding to the three user-selected group members. In certain embodiments, the messaging device 300 modifies header information of the message to replace the group alias with the user selection. While the depicted embodiment show the user-selected group members replacing the group alias, in other embodiments the messaging device 300 may address the message to the user-selected recipients in a manner transparent to the user (e.g., by making internal changes while continuing to display the group alias in the addressee field 304). Here, the user may continue to compose the reply message or the user may send the message to the user-selected group members.

Figure 4:
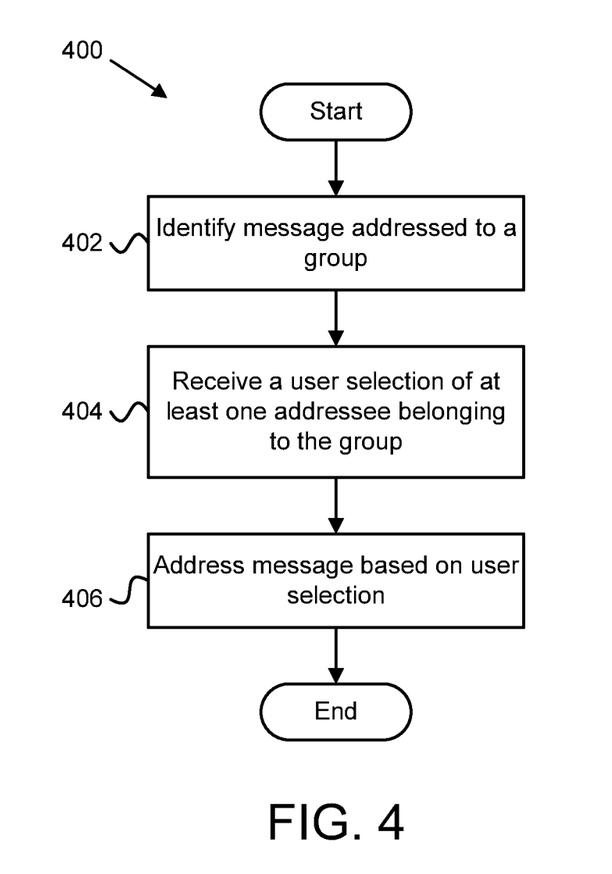
FIG. 4 is a schematic flow chart diagram illustrating one embodiment of a method for refining addresses in a group messaging environment.

FIG. 4 depicts a method 400 for refining addresses in a group messaging environment, according to embodiments of the disclosure. In some embodiments, the method 400 is performed using a messaging device, such as the messaging device 110, the selective group messaging module 118, the selective group messaging module 200, and/or the messaging device 300 described above with reference to FIGS. 1-2 and 3A-3D. In some embodiments, the method 400 is performed by a processor, such as a microcontroller, a microprocessor, a central processing unit (CPU), a graphics processing unit (GPU), an auxiliary processing unit, a FPGA, or the like.

The method 400 begins and the messaging device identifies 402 a message addressed to a group. In some embodiments, identifying 402 the message addressed to a group includes determining whether a recipient address of the message is a group address, an alias used by a group, a multicast address, a broadcast address, or the like. In some embodiments, identifying 402 the message addressed to a group includes determining whether a number of recipients of the message is above a threshold value.

The messaging device then receives 404 a user selection of at least one addressee belonging to the group. The addressee may include an address associated with a group member. In some embodiments, receiving 404 the user selection includes resolving the group into a plurality of individual addresses. In some embodiments, receiving 404 the user selection includes presenting a list of individual addresses associated with the group, wherein the messaging device received 404 the user selection responsive to presenting the list of individual addressees. In some embodiments, the user selection includes one or more additional addressees not belonging to the group.

Next, the messaging device addresses 406 the message based on the user selection. In some embodiments, addressing 406 the message includes modifying header information of the message to replace the identified group with the user selection. The message device addresses 406 the message to a subset of the group members based on the user selection. In certain embodiments, addressing 406 the message includes addressing the message to one or more additional addressees based on the user selection.

In some embodiments, the method 400 includes sending the message to the user-selected addressees. In some embodiments, the method 400 includes notifying the user that the message is addressed to a group. The method 400 ends.

Figure 5:
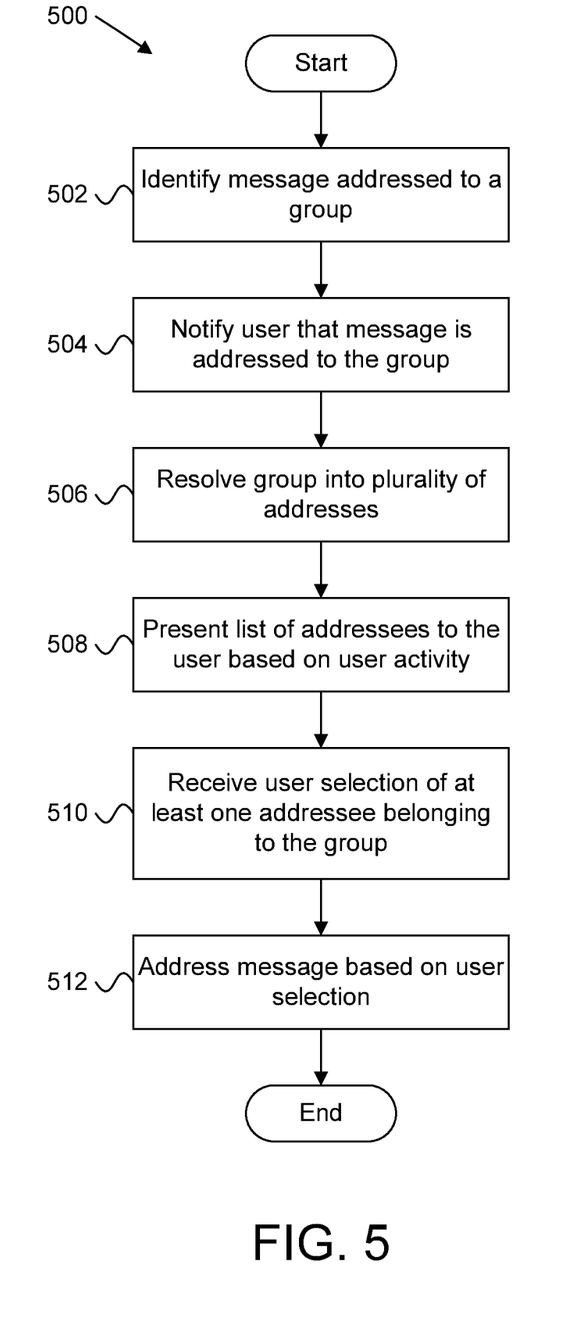
FIG. 5 is a schematic flow chart diagram illustrating another embodiment of a method for refining addresses in a group messaging environment.

FIG. 5 depicts a method 500 for refining addresses in a group messaging environment, according to embodiments of the disclosure. In some embodiments, the method 500 is performed using a messaging device, such as the messaging device 110, the selective group messaging module 118, the selective group messaging module 200, and/or the messaging device 300 described above with reference to FIGS. 1-2 and 3A-3D. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins and the messaging device identifies 502 a message addressed to a group. In some embodiments, identifying 502 the message addressed to a group includes determining whether a recipient address of the message is a group address, an alias used by a group, a multicast address, a broadcast address, or the like. In some embodiments, identifying 502 the message addressed to a group includes determining whether a number of recipients of the message is above a threshold value.

Next, the messaging device notifies 504 a user that the message is addressed to the group. In some embodiments, notifying 504 the user includes generating an audible alert. In some embodiments, notifying 504 the user includes generating a haptic or vibratory alert. In some embodiments, notifying 504 the user includes generating a visual alert. The visual alert may include any of an icon, text of a particular color, text of a particular size, text in bold, highlighted text, underlined text, and blinking text.

The messaging device then resolves 506 the group into a plurality of addresses, each address associated with a member of the identified group. In some embodiments, resolving 506 the group includes identifying a plurality of group members associated with a group address and retrieving an individual address for each identified group member. Examples of individual addresses associated with each group member include, but are not limited to, email addresses, phone numbers, usernames, or any other identifier used to communicate with an identified group member.

In some embodiments, resolving 506 the group includes searching a database using a group container to resolve the group container into a plurality of individual addressees associated with the group. In some embodiments, the database is a local database, such as a contacts database on the messaging device 110. In other embodiments, the database is a remote database, for example, located on the messaging server 132.

Next, the messaging device presents 508 a list of addressees to the user based on user activity. In some embodiments, the list of addressees includes the plurality of addresses resolved 506 from the group. In some embodiments, presenting 508 the list of addressees includes ordering the resolved plurality of addresses based on user activity. For example, in one embodiment, a most often messaged address may be presented 508 at the top of the list of addressees. In certain embodiments, presenting 508 the list of addressees includes filtering the resolved plurality of addresses based on user activity and/or message history. For example, where the message is the latest in a series of messages, the messaging device may filter a list of addressees to include only those of the plurality of group members that have authored messages in the series of messages.

The messaging device then receives 510 a user selection of at least one addressee belonging to the group. The addressee may include an address associated with a group member. In some embodiments, receiving 510 the user selection occurs in response to presenting 508 the list of addressees. In some embodiments, receiving 510 the user selection includes receiving a user selection of one or more additional addressees not belonging to the group.

Next, the messaging device addresses 512 the message based on the user selection of at least one addressee. In some embodiments, addressing 512 the message includes modifying header information of the message to replace the identified group with the user selection. The message device may address 512 the message to a subset of the group members based on the user selection. In certain embodiments, addressing 512 the message includes addressing the message to one or more additional addressees based on the user selection. In some embodiments, addressing 512 the message includes sending the message to the addressees. The method 500 ends.

Figure 6:
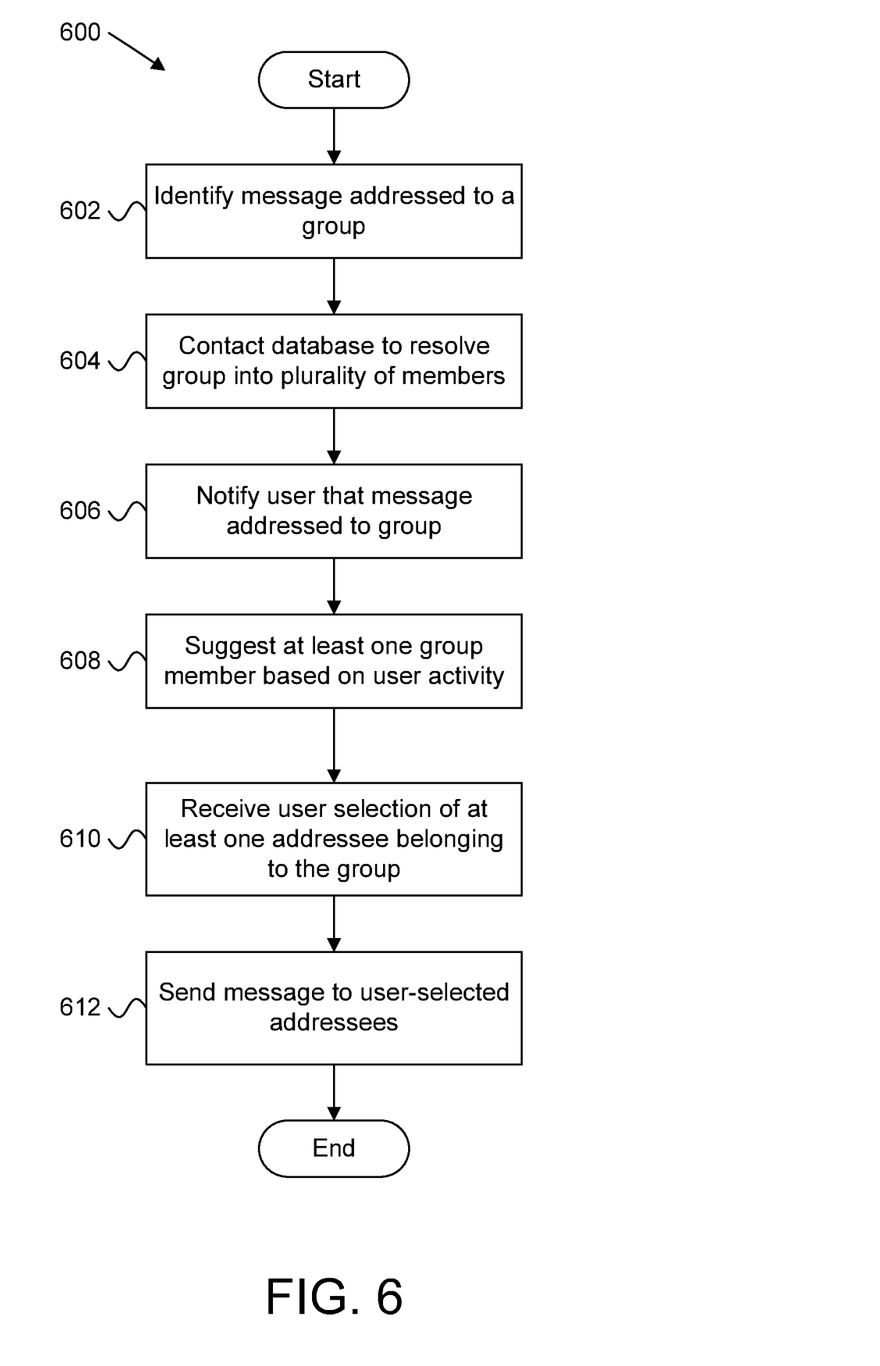
FIG. 6 is a schematic flow chart diagram illustrating another embodiment of a method for refining addresses in a group messaging environment

FIG. 6 depicts a method 600 for refining addresses in a group messaging environment, according to embodiments of the disclosure. In some embodiments, the method 600 is performed using a messaging device, such as the messaging device 110, the selective group messaging module 118, the selective group messaging module 200, and/or the messaging device 300 described above with reference to FIGS. 1-2 and 3A-3D. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and the messaging device identifies 602 a message addressed to a group. In some embodiments, identifying 602 the message addressed to a group includes determining whether a recipient address of the message is a group address, an alias used by a group, a multicast address, a broadcast address, or the like. In some embodiments, identifying 602 the message addressed to a group includes determining whether a number of recipients of the message is above a threshold value.

The messaging device then contacts 604 a database to resolve the group into a plurality of group members, each group member associated with an individual address. In some embodiments, the database is a local database, such as a contacts database on the messaging device 110. In other embodiments, the database is a remote database, for example, located on the messaging server 132. Contacting 604 the database may include retrieving an individual address for each identified group member. In certain embodiments, the database stores email addresses, phone numbers, usernames, and/or other identifiers useable for communication with an identified group member.

Next, the messaging device notifies 606 a user that the message is addressed to the group. In some embodiments, notifying 606 the user includes generating an audible alert. In some embodiments, notifying 606 the user includes generating a haptic or vibratory alert. In some embodiments, notifying 606 the user includes generating a visual alert. The visual alert may include any of an icon, text of a particular color, text of a particular size, text in bold, highlighted text, underlined text, and blinking text.

The messaging device then presents 608 a list of addressees to the user based on user activity. In some embodiments, the list of addressees includes the plurality of group members. In some embodiments, presenting 608 the list of addressees includes ordering the resolved plurality of addresses based on user activity. For example, in one embodiment, the list of addressees may be ordered according to frequency, either as a sender or as a recipient. In certain embodiments, presenting 608 the list of addressees includes filtering the resolved plurality of addresses based on user activity and/or message history. For example, where the message is the latest in a series of messages, the messaging device may filter a list of addressees to include only those of the plurality of group members that have authored messages in the series of messages.

Next, the messaging device receives 610 a user selection of at least one addressee belonging to the group. The addressee may include an address associated with a group member. In some embodiments, receiving 610 the user selection occurs in response to presenting 608 the list of addressees. In some embodiments, receiving 610 the user selection includes receiving a user selection of one or more additional addressees not belonging to the group.

The messaging device then sends 612 the message based on the user selection of at least one addressee. In some embodiments, sending 612 the message includes modifying header information of the message to replace the identified group with the user selection. The message device may address the message to a subset of the group members based on the user selection. In certain embodiments, sending 612 the message includes addressing the message to one or more additional addressees based on the user selection. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
determine whether a first message composed at the apparatus is addressed to a group, said determination occurring in response to a user beginning to compose the message;
notify the user that the message is addressed to the group, in response to determining that the message is addressed to the group;
prompt the user whether to reply to a subset of the group, in response to notifying the user;
resolve the group into a plurality of addressees;
display the plurality of addressees at the apparatus in response to the user deciding to reply to the subset of the group;
receive user selection of one or more addressees from the displayed plurality of addressees in response to the user deciding to reply to the subset of the group;
replace the identified group with the user selection in a message header of the message; and
send the message to the one or more user selected addressees.

2. The apparatus of claim 1, further comprising code that prompts for confirmation in response to the user selecting all of the addressees.

3. The apparatus of claim 1, further comprising code that addresses the message to additional recipients unassociated with the group in response to the user defining the addressees.

4. The apparatus of claim 1, wherein displaying the plurality of addressees at the apparatus comprises presenting, to a user, a list of addressees for user selection, wherein the list is ordered based on user activity.

5. The apparatus of claim 4, further comprising code that filters the list of addressees based on message history.

6. The apparatus of claim 1, further comprising code that suggests one or more addressees based on a user activity log.

7. The apparatus of claim 1, further comprising code that stores the user selection of one or more addressees in a user activity log.

8. The apparatus of claim 1, wherein the user notification is a notification selected from the group consisting of: an audible notification, a visual notification, and a haptic notification.

9. The apparatus of claim 1, wherein determining that the message is addressed to a group comprises one of: determining that the message is addressed to a group alias and determining that the message is addressed to more than a threshold number of recipients.

10. A method comprising:
  composing, by use of a processor, a first message at a messaging device, the first message being a reply to a second message, said determination occurring in response to a user beginning to compose the first message;
  determining, at the messaging device, whether the first message is addressed to a group;
  notifying the user that the first message is addressed to the group, in response to determining that the first message is addressed to the group;
  prompting the user whether to reply to a subset of the group in response to notifying the user;
  displaying, at the messaging device, a plurality of addressees belonging to the group in response to the user deciding to reply to the subset of the group;
  receiving, at the messaging device, a user selection of at least one addressee from the displayed plurality of addressees belonging to the group; and
  replacing the identified group with the user selection in a message header of the first message prior to sending the first message.

11. The method of claim 10, further comprising:
  resolving the group into a plurality of group members; and
  presenting, to the user, the plurality of group members in an order based on user activity.

12. The method of claim 10, further comprising suggesting, to the user, one or more addressees based on user activity.

13. The method of claim 10, wherein the user notification comprises a visual notification selected from the group comprising: an icon, text of a particular color, text of a particular size, text in bold, highlighted text, underlined text, and blinking text.

14. The method of claim 10, wherein determining whether the first message is addressed to a group comprises:
  determining a number of recipient addresses associated with the first message;
  comparing the number of addresses to a threshold amount; and
  identifying the first message as being addressed to a group in response to the number of recipient addresses exceeding the threshold amount.

15. The method of claim 10, wherein determining whether the first message is addressed to a group comprises comparing a recipient alias of the first message to a list of group aliases.

16. A program product comprising a computer readable storage medium that stores code executable by a processor to perform:
  determining, identifying, at a messaging device, whether a first message composed at the apparatus is addressed to a group, the first message replying to a second message, said determination occurring in response to a user beginning to compose the first message;
  notifying the user that the first message is addressed to the group, in response to determining that the first message is addressed to the group;
  prompting the user whether to reply to a subset of the group in response to notifying the user;
  resolving, at the messaging device, the group into a plurality of group members;
  displaying, at the messaging device, the plurality of group members in response to prompting the user to reply to the subset of the group;
  receiving, at the messaging device, a user selection of at least one addressee from among the displayed plurality of group members;
  replacing, at the messaging device, the identified group with the user selection in a message header of the first message prior to sending the first message; and
  sending the first message to the at least one user-selected addressee.

17. The program product of claim 16, the code further executable to perform suggesting, to the user, one or more addressees based on user activity.

18. The program product of claim 16, wherein determining that the first message is addressed to a group comprises one of: determining that the first message is addressed to a group alias and determining that the first message is addressed to more than a threshold number of recipients.

* * * * *